Figure 1:
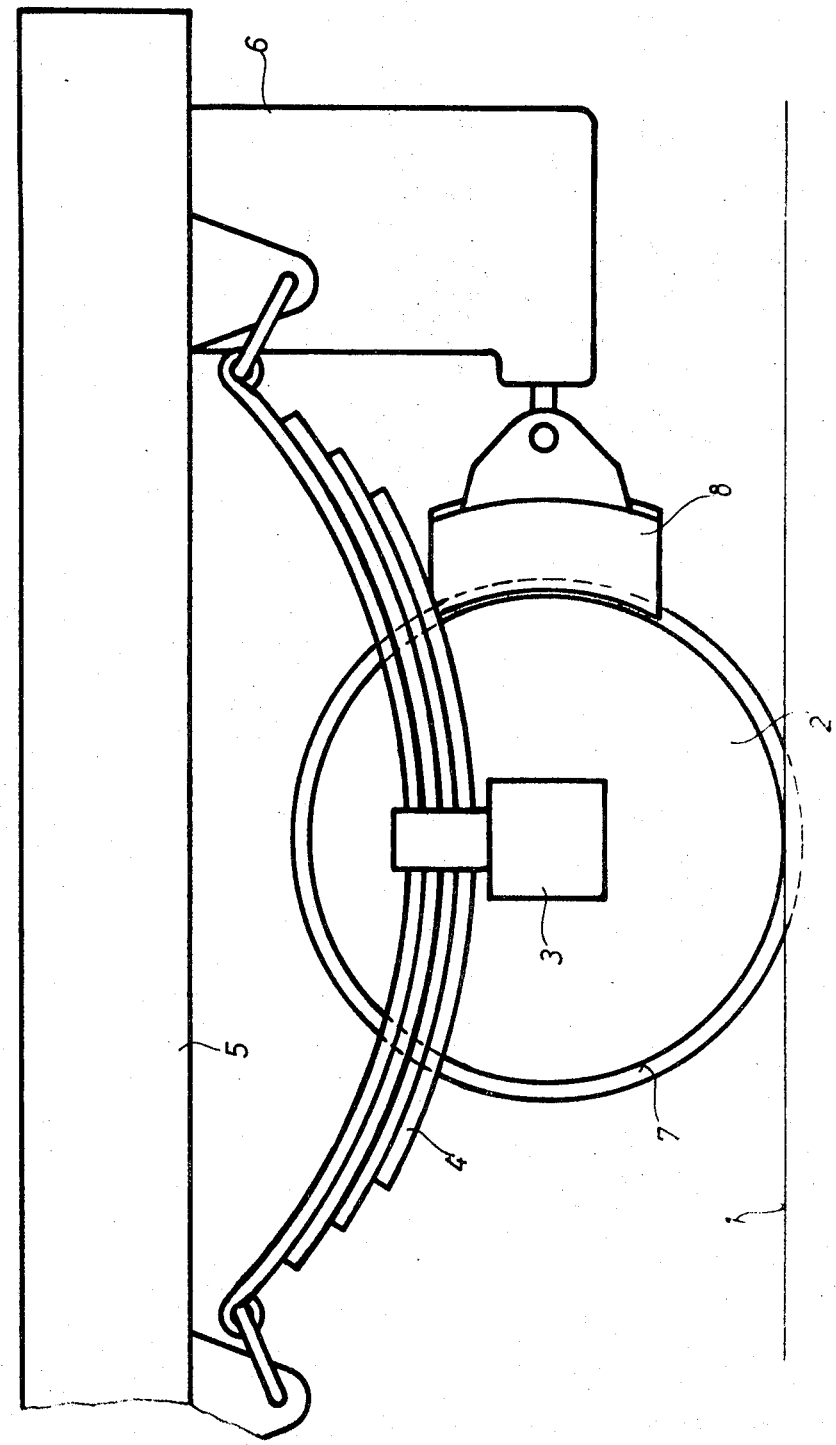

United States Patent

[11] 3,557,915

| [72] | Inventor | Hans Pollinger |
| | | Munich, Germany |
| [21] | Appl. No. | 776,049 |
| [22] | Filed | Nov. 15, 1968 |
| [45] | Patented | Jan. 26, 1971 |
| [73] | Assignee | Knorr-Bremse GmbH |
| | | Munich, Germany |
| | | a corporation of Germany |
| [32] | Priority | Mar. 1, 1968 |
| [33] | | Germany |
| [31] | | 1680381 |

[54] BRAKE SHOE ADJUSTING MECHANISM FOR A RAILWAY VEHICLE BRAKING UNIT
1 Claim, 2 Drawing Figs.

| [52] | U.S. Cl. | 188/203, |
| | | 188/153 |
| [51] | Int. Cl. | F16d 65/56 |
| [50] | Field of Search | 188/52, |
| | | 153; 196PRR, 198—203S |

[56] References Cited
UNITED STATES PATENTS

| 8,812 | 3/1852 | Walber | 188/153X |
| 175,886 | 4/1876 | Westinghouse | 188/153 |
| 2,913,071 | 11/1959 | Mueller | 188/153 |
| 3,430,739 | 3/1969 | Persson et al. | 188/202(S) |

Primary Examiner—Duane A. Reger
Attorney—Edward M. Jaskiewicz

ABSTRACT: A braking unit has a housing mounted on the spring supported frame of a railway vehicle. A fluid pressure actuator is mounted on the housing and through a translating mechanism within the housing moves a brake shoe into braking engagement with the peripheral surface of the vehicle wheel. The brake shoe is mounted on the end of a cylindrical spindle which is slidably mounted within a casing which in turn is slidably carried within the housing. Within the housing there is a mechanism interconnecting the spindle and the casing in such a manner to adjust the play between the disengaged brake shoe and the vehicle wheel to a predetermined distance from either direction in immediate response to any variation from this play.

BRAKE SHOE ADJUSTING MECHANISM FOR A RAILWAY VEHICLE BRAKING UNIT

The present invention relates to a braking unit mounted on the spring supported frame of a railway vehicle for actuating a brake shoe into braking engagement with a vehicle wheel, more particularly, to immediately and automatically adjusting the play between the brake shoe and the wheel from both directions.

Braking units of the type to which the present invention relates have been provided with relatively simple devices to automatically adjust the distance between the disengaged brake shoe and a railway vehicle wheel in order to compensate for wear of the brake shoe. Such devices, however, are not able to increase the play between the brake shoe and the wheel to a predetermined minimum distance if the play is less than this predetermined distance.

In braking units of the general type referred to above the brake shoe, when in the disengaged position, occasionally binds against the periphery of the vehicle wheel. The braking unit is usually mounted on the vehicle frame in such a location that the brake shoe will be at the level of the wheel axle when the vehicle is empty or only slightly loaded. As the load is increased on the vehicle and the springs are compressed, the braking unit together with the vehicle frame and other components of the vehicle which are not supported by the springs will be lowered the same distance that the vehicle springs are compressed. The brake shoe will then be positioned below the level of the wheel axle so that the horizontal distance between the brake shoe and the peripheral surface of the wheel will be increased. During subsequent braking operation, the device for automatically adjusting the play will decrease this distance to the predetermined minimum by automatically positioning the brake shoe closer to the periphery of the wheel. However, when the vehicle is now unloaded and the suspension springs are relaxed, the vehicle frame and the braking unit will again be lifted to the original level. The brake shoe will now be positioned less than the predetermined distance from the periphery of the wheel and this proximity of the brake shoe to the wheel may cause a binding of the brake shoe because of a wedging action between the brake shoe and wheel.

In order to eliminate such a possible binding of the brake shoe with the wheel under these circumstances it has been proposed to adjust the play in braking units at a sufficiently large distance so that relaxation of the vehicle springs due to unloading of the vehicle will not cause the brake shoes to contact the braking surfaces of the wheel while the brakes are disengaged. Providing such a large play between the disengaged brake shoe and the wheel is disadvantageous since this relatively large play must be overcome each time the brakes are applied and this requires the use of a considerably larger quantity of compressed air for the actuating mechanism.

Where a compressed air actuated braking cylinder is connected through a braking linkage system with a plurality of friction brakes on a railroad vehicle, it has been known to provide such linkage systems with double-acting adjusters in order to make the desired adjustment in the position of the brake shoe when the play between the disengaged brake shoe and the wheel is either too large or too small.

It is therefore the principal object of the present invention to provide a novel and improved braking unit for a railway vehicle.

It is another object of the present invention to provide a braking unit for railway vehicles wherein the free play between the disengaged brake shoe and the braking surface of the wheel may be maintained at a relatively small predetermined distance while preventing any binding of the brake shoes with the braking surface of the wheel.

It is a further object of the present invention to provide a railway vehicle braking unit with a device for adjusting the play between the disengaged brake shoe and the braking surface of the wheel from either direction and in immediate response to any variation from the predetermined distance of this play.

According to the present invention, the braking unit may comprise a housing which is mounted onto the spring supported frame of a railway vehicle. The housing is provided with a variable length free play adjusting mechanism which acts horizontally in a radial direction with respect to the peripheral braking surface of a railway vehicle wheel. The adjusting mechanism comprises an outer portion upon which is mounted by the brake shoe. A fluid pressure actuator is mounted on the housing and through a translating means within the housing translates the movement of the actuator into a force to move the braking shoe into braking engagement against the wheel. The adjusting mechanism essentially comprises a casing which is slidably mounted within the housing and a helically splined cylindrical spindle which is slidably mounted within the casing for axial movement. A spring is positioned within the spindle to urge the spindle toward the wheel. A coupling nut is threaded on the spindle and has oppositely disposed coupling surfaces. The casing is provided with a pair of oppositely disposed coupling surfaces which straddle the nut coupling surfaces, the distance between the casing coupling surfaces being slightly greater than the distance between the nut coupling surfaces. A spring urges the coupling nut toward the wheel. Abutment means are resiliently mounted within the housing at a distance from the coupling nut, when the brake is disengaged, equal to the play between the disengaged brake shoe and the peripheral braking surface of the wheel. The abutment means is yieldable under the force exerted by the coupling nut and the spring means acting thereagainst.

The casing is preferably cylindrical in shape and the cylindrical splined spindle is slidably disposed therein. Opposite ends of the casing and spindle are closed with the spring within the spindle bearing against these closed ends so as to urge the spindle toward the vehicle wheel.

Figure 2:
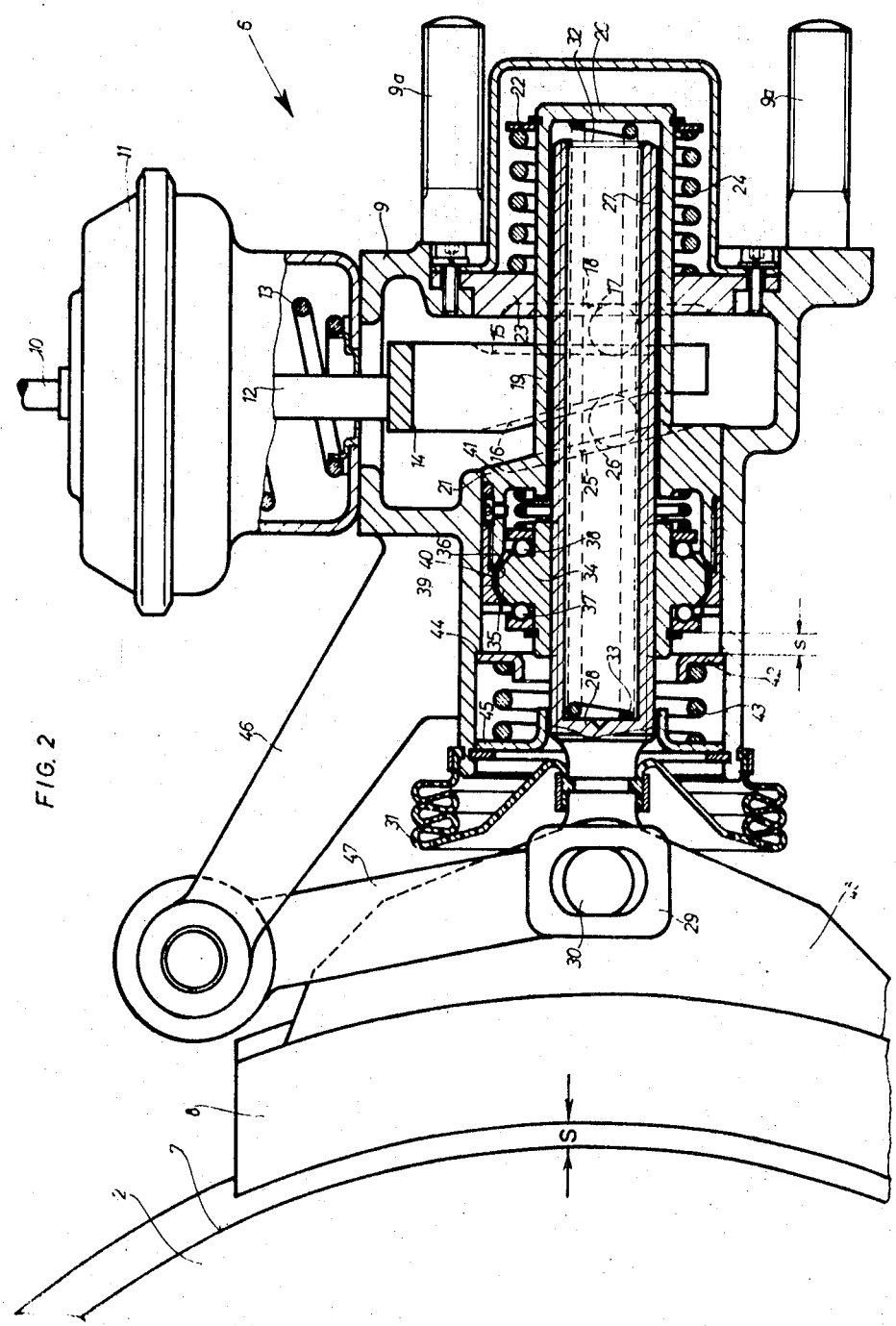

Other objects and advantages of the present invention will be apparent upon reference to the accompanying description when taken in conjunction with the following drawings, which are exemplary, wherein;

FIG. 1 shows schematically an elevational view of a braking unit mounted on a vehicle frame in accordance with the present invention and its relationship to an associated vehicle wheel; and FIG. 2 is a vertical sectional view of a portion of the braking unit in FIG. 1 but in enlarged scale and showing the play adjusting mechanism therein.

Proceeding next to the drawings wherein like reference symbols indicate the same parts throughout the various views, a specific embodiment of the present invention will be described in detail.

In FIG. 1 there is shown a portion of a railway vehicle incorporating the present invention and supported on a rail surface 1 by railway wheels 2 whose axle (not shown in the drawings) is journaled in bearings 3 which may be located in a journal box in the conventional manner. Vehicle springs 4 are attached to the upper portion of the bearings 3 and are suspended at their ends from suitable brackets on the underside of the vehicle frame 5. The vehicle frame 5 is thus resiliently supported by the springs 4 with respect to the rails surface 1.

Braking units 6 are fastened to the frame 5 and carry brake shoes 8 located at the horizontal level of the wheel axle so as to be moved horizontally against the peripheral braking surface 7 of the wheel 2.

Proceeding next to FIG. 2, each braking unit comprises a housing 9 which is rigidly attached by bolts 9a to the vehicle frame 5. Upon the housing 9 there is mounted a vertically positioned brake actuating cylinder 11 which is connected to a supply of compressed air through a tubular conduit 10. Within the cylinder 11 there is slidably mounted a piston to which is attached a piston rod 12 which is urged to its uppermost position by a coil spring 13.

Piston rod 12 extends downwardly into the housing 9 and has a forked wedge 14 at its end. One side of wedge 14 has a guide surface 15 which is parallel to the axis of brake cylinder 11 and the other side of the wedge is provided with an inclined surface 16. During vertical movement of wedge 14 the wedge is supported laterally at the surface 15 by a roller 17 and at the inclined surface 16 by a roller 26.

Within housing 9 substantially at the axle level of the wheel 2 a tubular casing 19 is slidably mounted so as to move radially with respect to the vehicle wheel 2. The casing 19 is substantially cylindrical in shape and is positioned within the open space in the forked wedge 14. The end of the casing away from the vehicle wheel is closed by an end wall 20 while at its opposite end there is provided an enlargement portion 21 which is formed of two parts connected rigidly to each other.

On the outer surface of casing 19 near the end closure 20 there is provided a radially extending spring plate 22 against which there is one end of a spring 24. The other end of spring 24 bears against a wall 23 formed within housing 9 and slidably carrying the casing 19.

The enlarged portion 21 on the casing is provided with an inclined surface 25 which is parallel to the inclined surface 16 of the wedge member 14. The roller 26 is interposed between these two inclined parallel surfaces.

Slidably mounted within the tubular casing 19 is an axially movable hollow cylindrical spindle 27 whose end towards the vehicle wheel is closed at 28. A portion of the spindle extends outwardly of housing 9 toward the wheel and is provided with an elongated bearing opening 29 in which there is disposed a vertically movable bolt 30. A flexible bellows 31 has one end attached to spindle 27 and the other end is attached to the outer surface of the housing 9. Within spindle 27 and between the end closures 20 and 28 there is positioned a precompressed spring 33 so as to urge these end walls away from each other.

The spindle 27 which is provided with helical splines on its outer surface has threaded thereon a similarly splined coupling nut 34. Nut 34 is provided on its periphery with a pair of oppositely disposed conical coupling surfaces 35 and 36. In addition, on one side of the nut 34 there is positioned a thrust ball bearing 37 and on the other side a thrust ball bearing 38. The nut coupling surfaces 35 and 36 cooperate with two similar coupling surfaces 39 and 40 which are formed on the inner portion of the enlargement 21 which extends partially around the coupling nut 34. The casing coupling surfaces 39 and 40 are spaced from each other at a slightly greater distance than the distance between the two nut coupling surfaces 35 and 36.

A relatively weak spring 41 is positioned between the ball bearing 38 and an inner end wall of the enlarged portion 21 on the casing 19 so as to position the coupling nut 34 with respect to this end wall of the casing. The other ball thrust bearing 37 which is on the side of the coupling nut facing toward the vehicle wheel is spaced by a distance s from an annular abutment 42 which is movable within the housing 9 along the axis of the spindle 27. The distance s corresponds to the predetermined free play in the braking unit when the casing is in its end position with the wedge 14 completely retracted so that the brake shoe is in the disengaged position.

A spring 43 which is sufficiently strong to overpower spring 41 urges the abutment 42 away from the vehicle wheel 2 against an inner annular shoulder 44 formed in the housing 9. The other end of spring 43 abuts against a ring 45 seated within the housing 9 and surrounding the front end of the spindle 27.

The housing 9 is provided with an arm 46 which extends upwardly at an angle toward the vehicle wheel 2 with the upper end of the arm 46 having a substantially vertical arm 47 pivotally connected to it. The lower end of the vertical arm 47 carries the elongated bearing opening 29 for the brake head 48 upon which the brake shoe 8 is rigidly mounted in a manner known in the art.

The components of the braking unit are illustrated in FIG. 2 in their positions when the brake is disengaged. With the brake disengaged, there is no air pressure in cylinder 11 and the piston rod 12 is retained in its uppermost position under the action of return spring 13. Similarly, wedge 14 is in its uppermost position and rollers 17 and 26 will be opposite from each other across the thinnest portion of the wedge. The spring 24 positions the casing 19 at its maximum position away from the vehicle wheel. Spring 41, acting through the thrust bearing 38, urges coupling nut 34 to the left to bring coupling surfaces 35 and 39 into contact while coupling surfaces 36 and 40 are spaced from each other as shown in FIG. 2. Casing 19 is held against rotation by the forked wedge 14 and coupling nut 34 is held against rotation by means of the contacting coupling surfaces 35 and 39. Ball thrust bearing 37 is axially spaced a distance s from the abutment 42 which is seated against shoulder 44. The spindle 27 which is held against rotation by the vertical supporting arm 47, bolt 30 and bearing opening 29 is retained in such a position that through the interaction of bolt 30 and brake head 48 the brake shoe 8 will be positioned also at distance s from braking surface 7. The disengaged brake shoe 8 is thus spaced from the periphery 7 of the wheel at a predetermined distance to provide the desired free play.

Upon application of the brakes, the brake cylinder 11 will be supplied with compressed air through conduit 10 to move the piston rod 12 and the wedge 14 downwardly against the force of spring 13. Roller 17 will provide for parallel guided movement of wedge 14 while roller 26 under increasing pressure because of inclined surface 16 will bear against inclined surface 25 to move casing 19 to the left as viewed in FIG. 2 against the force of spring 24. Since spring 33 in spindle 27 is under compression, the spindle and the coupling nut 34 will be moved together with casing 19 to cause bearing 29 on the end of spindle 27 to act through bolt 30 and brake head 48 to move the brake shoe against the brake surface 7. When the free play is correctly adjusted, the brake shoe 8 will contact the brake surface 7 at the same time that the thrust bearing 37 contacts abutment 42. Upon further movement of casing 19 to the left, the spindle 27 will at first be held back because of the contacting of brake shoe 8 with the brake surface 7 and the resulting reaction through the brake head 48 and bolt 30. Coupling nut 34 because of its engagement with abutment 42 will also remain in this position while the spring 41 will be further compressed by the continued movement of casing 19 to the left. This continued movement of casing 19 to the left will disengage the coupling surfaces 35 and 39 and after further movement of casing 19 the coupling surfaces 36 and 40 will come in contact. From this point on, casing 19 and coupling nut 34 will continue to move to the left as a single unit without rotation. Coupling nut 34 will move spindle 27 along with it because of the helical spline connection therebetween.

The extent of this movement of the casing, coupling nut and spindle is dependent on the elastic deformation of the several components between the spindle 29 and the contact surface formed by brake shoe 8 and braking surface 7. It is thus apparent that the wedge 14 translates the relatively small downward force exerted by the brake cylinder 11 into a relatively great force exerted by the brake shoe. During this movement of the coupling nut 34 corresponding to this elastic deformation the abutment 42 will be moved against the force of spring 43 under the action of the thrust bearing 37.

When the brake is to be disengaged, compressed air is exhausted from cylinder 11 and return spring 13 will raise the piston rod 12 and the wedge 14 to their uppermost position. The above-mentioned elastic deformation in conjunction with the return action of springs 24 and 43 will initially move spindle 27 together with coupling nut 34 and casing 19 to the right until abutment 42 becomes seated against the internal shoulder 44 and brake shoe 8 engages only lightly brake surface 7. As the brake disengagement continues, spring 24 acting by itself will move casing 19 further to the right. The expanding action of springs 33 and 41 will maintain spindle 27 and coupling nut 34 in their present position where thrust bearing 37 is in contact with abutment 42. The coupling surfaces 36 and 40 will then become separated and after a short movement to the right of casing 19 coupling surfaces 35 and 39 will come into contact. Further movement to the right of casing 19 under the action of spring 24 will carry coupling 34 along but the coupling nut will be prevented from rotation by the engagement of the coupling surfaces 39 and 40. Coupling nut 34 acts through the helical spline connection to carry along with its spindle 27. The spindle 27 through the interaction of bearing 29 and bolt 30 will move brake shoe 8 into its disengaged position.

When the brake shoe 8 has worn so that the distance between the disengaged brake shoe and brake surface 7 is greater than the predetermined distance s, then the thrust bearing 37 will contact abutment 42 after the free play between these two components has been traversed. However, when these components are in this position, brake shoe 8 will not yet have reached a position where it will frictionally engage the brake surface 7. During further forward or movement to the left of casing 19 coupling nut 34 will be held from movement because of the contact of thrust bearing 37 with the abutment 42 and, accordingly, coupling surface 39 will become disengaged from coupling surface 34. Upon this disengagement of the coupling surfaces, coupling nut 34 will be free to rotate and spring 33 will then move the spindle 27 outwardly until brake shoe 8 contacts brake surface 7. During this movement of the spindle 27, coupling nut 34 will be free to rotate and will move further to the right on spindle 27 as viewed in FIG. 2. Upon continued movement to the left of casing 19 coupling surfaces 36 and 40 will come into contact to hold the coupling nut 34 against rotation. Further braking and subsequent brake disengagement will then proceed as described above.

It may occur that at the beginning of the braking operation the distance of the disengaged brake shoe from the brake surface is less than the predetermined free play distance. Under these circumstances brake shoe 8 will contact brake surface 7 while the thrust bearing 37 is still spaced from the abutment 42. As the casing 19 continues to move to the left, spindle 27 will remain stationary because of the engagement of the brake shoe with the brake surface while at the same time spring 33 will be compressed. The coupling nut 34, because of its spline connection with the spindle 27 which is being held stationary, will also be stationary whereby coupling surfaces 39 and 35 will become disengaged from each other. Coupling nut 34 is now free for rotation and the force of spring 41 on thrust bearing 38 will rotate the coupling nut so that the nut moves to the left on spindle 27 a distance dependent on the extent of movement of the casing 19 to the left. The coupling nut will continue to move to the left until the ball thrust bearing 37 contacts abutment 42. At this time coupling surfaces 36 and 40 will come into contact with each other. In this manner the predetermined distance of free play will again be established and further braking will occur as described above. Disengagement of the brake will also occur as described above and when brake shoe 8 is completely disengaged the brake shoe will have the predetermined distance of free play.

It is thus apparent that if the free play distance is either too large or too small with respect to the predetermined distance, the free play distance will be adjusted to the predetermined distance automatically during the next application of the brakes.

It has been described above that when a railway vehicle is loaded to the extent that the springs are fully depressed the brake shoes may be adjusted to the predetermined distance from the brake surface for this loaded condition of the vehicle. When this vehicle is being unloaded the brake shoes, while disengaged, may contact the braking surface of the wheel. As the unloading of the vehicle continues so that the suspension springs return to their normal position the brake shoe will be urged to the right against the force of spring 33 by the increasing contact between the brake shoe and the braking surface as the vehicle is unloaded. As the brake shoe moves to the right the spindle 27 through the bolt connection 30 will also move to the right while casing 19 remains stationary. As the spindle moves to the right, coupling nut 34 will also be carried to the right until the coupling surfaces 35 and 39 are disengaged so that coupling nut 34 is free to rotate. Further movement of spindle 27 to the right will cause spring 41 to move coupling nut 34 to the left on the spindle 27.

When the spindle 27 has stopped moving to the right under the action of brake shoe 8, coupling nut 34 will still continue moving slightly to the left upon spindle 27 until the coupling surfaces 35 and 39 contact each other. At this point the brake shoe 8 will be urged against the brake surface 7 only by the spring 33. As a result, brake shoe 8 will only lightly contact brake surface 7 and will not produce any appreciable braking effect. However, during the next succeeding braking application the predetermined amount of free play between the disengaged brake shoe and the braking surface will be established in the manner as described above.

Thus it can be seen that with a braking unit according to the present invention under no conditions will the brake shoe bind against the brake surface of the wheel even when the horizontal level of the brake shoe with respect to the wheel varies during loading and unloading operations. With this braking unit it is possible to maintain the free play distance between the disengaged brake shoe and the wheel braking surface at a very small amount. Thus, it is only necessary to move the brake shoe a very small amount during a braking operation before the brake shoe contacts the braking surface to produce the braking effect. Accordingly, the amount of compressed air required to be admitted to the actuator 11 can be kept to a minimum. The hollow tubular construction of the casing slidable within the housing and the spindle slidable within the casing together with the positioning of the spring within the hollow spindle produces a very compact and self-contained unit.

While the braking unit has been described above as being actuated by a fluid pressure actuator it is to be understood that the braking unit may be manually operated through suitable linkages connected to the wedge member 14.

It will be understood that this invention is subject to modification in order to adapt it to different uses and conditions and, accordingly, it is desired to comprehend such modification within this invention as may fall within the scope of the appended claims.

I claim:

1. A braking unit for mounting on a spring supported frame of a railway vehicle, and comprising a housing adapted to be attached to the spring supported frame, actuator means on said housing, a brake shoe carried by said housing and engageable with the peripheral braking surface of a railway vehicle wheel, means within said housing for translating movement of said actuator means into a force to move said brake shoe into braking position against said wheel, and means within said housing and responsive to variation from a predetermined distance between the disengaged brake shoe and wheel for adjusting automatically from either direction the play between the disengaged brake shoe and the wheel, said adjusting means being moveable radially with respect to the vehicle wheel and comprising a casing slideably mounted within said housing for movement toward said vehicle wheel in response to said translating means, a helically splined spindle slideably mounted within said casing for axial movement therein, first spring means urging said spindle toward said wheel, a coupling nut threaded on said spindle splines and having oppositely disposed coupling surfaces thereon, a pair of oppositely disposed coupling surfaces on said casing and straddling said nut coupling surfaces, the distance between said casing coupling surfaces being greater than the distance between said nut coupling surfaces, second spring means urging said coupling nut toward the wheel, and abutment means resiliently mounted within said housing at a distance from said coupling nut when the brake is disengaged equal to the play between the disengaged brake shoe and the wheel braking surface and yieldable under the force exerted by said coupling nut and said second spring means, said casing and spindle both being hollow cylinders with their opposite ends being closed, and a spring within said spindle acting against said closed ends to urge said closed ends apart.